United States Patent
Chan et al.

(10) Patent No.: US 12,271,460 B2
(45) Date of Patent: Apr. 8, 2025

(54) USER AUTHENTICATION WITH BIOMETRIC DATA IN CONJUNCTION WITH AUTOFILL ASSISTANCE

(71) Applicant: MASTERCARD TECHNOLOGIES CANADA ULC, Vancouver (CA)

(72) Inventors: Sik Suen Chan, Richmond (CA); Perry McGee, Vancouver (CA)

(73) Assignee: MASTERCARD TECHNOLOGIES CANADA ULC, Vancouver (CA)

( * ) Notice: Subject to any disclaimer, the term of this patent is extended or adjusted under 35 U.S.C. 154(b) by 281 days.

(21) Appl. No.: 18/148,900

(22) Filed: Dec. 30, 2022

(65) Prior Publication Data
US 2024/0220593 A1  Jul. 4, 2024

(51) Int. Cl.
*G06F 21/32* (2013.01)
*G06F 40/174* (2020.01)

(52) U.S. Cl.
CPC ............ *G06F 21/32* (2013.01); *G06F 40/174* (2020.01)

(58) Field of Classification Search
CPC ....... G06F 21/32; G06F 40/174; H04L 9/3231
See application file for complete search history.

(56) References Cited

U.S. PATENT DOCUMENTS

| | | | |
|---|---|---|---|
| 2019/0080189 A1* | 3/2019 | Van Os | H04N 23/62 |
| 2020/0073924 A1 | 3/2020 | Sokol et al. | |
| 2020/0151315 A1* | 5/2020 | Lee | G06F 3/04842 |
| 2021/0342525 A1* | 11/2021 | Leme | G06F 3/0482 |
| 2022/0342972 A1* | 10/2022 | Van Os | G06V 40/172 |

FOREIGN PATENT DOCUMENTS

| | | |
|---|---|---|
| WO | 2022159899 A1 | 7/2022 |
| WO | 2022260860 A1 | 12/2022 |

OTHER PUBLICATIONS

Zdenka Sitova et al. "HMOG: New Behavioral Biometric Features for Continuous Authentication of Smartphone Users," 2016, pp. 877-892. (Year: 1016).*
Shaohua Wang et al. "An Intelligent Framework for Auto-filling Web Forms from Different Web Applications," 2013, pp. 175-179. (Year: 2013).*
International Search Report and Written Opinion for Application No. PCT/CA2023/051736 dated Feb. 26, 2024 (8 pages).

* cited by examiner

*Primary Examiner* — Luu T Pham
*Assistant Examiner* — Canh Le
(74) *Attorney, Agent, or Firm* — Michael Best & Friedrich LLP (57) ABSTRACT

Devices, methods, and non-transitory computer-readable media for user authentication with biometric data in conjunction with autofill assistance. In one example, an electronic computing device includes a memory including a user account and an electronic processor communicatively coupled to the memory. The electronic processor is configured to receive a request to access the user account and biometric data associated with the request, determine whether an autofill assistance occurred while the biometric data was captured, responsive to determining that the autofill assistance occurred while the biometric data was captured, identify data associated with the autofill assistance in the biometric data, generate second biometric data by excluding the data associated with the autofill assistance from the biometric data, and perform user authentication based on the second biometric data.

17 Claims, 6 Drawing Sheets

USER AUTHENTICATION WITH BIOMETRIC DATA IN CONJUNCTION WITH AUTOFILL ASSISTANCE

BACKGROUND

Currently, when users enter information such as a username and password into, for example, a login form of a web-application, biometric data such as keystroke rate, number of mouse clicks, and the like are used to authenticate a user. A biometric data profile for a user may be established and associated with a user account (such as a mobile banking account) defined by the information that is entered. This biometric data profile may contain information such as the typical keystroke rate and number of mouse clicks per minute of the user. When the user subsequently enters the information associated with the user account, biometric data associated with the action of entering the information is collected. The collected biometric data is then compared to the biometric data profile associated with a user account. If the collected biometric information matches the biometric data profile (and other entered credentials are correct) a user is authenticated and access to the user account associated with the entered information is authorized.

In some instances, when login credentials are entered into a login form, a system cannot authenticate a user because the biometric data may be insufficient for authentication. In one example, the biometric data for authenticating a user may be insufficient when a user enters login credentials using an autofill function. A system may flag biometric data and revert to behavioral features (e.g., a geolocation, an internet protocol (IP) address, a unique device identifier (UDID), a decentralized identifier (DID), a device fingerprint, a web browser, a user agent, a time stamp, a combination of the foregoing, and the like) when the system detects the use of the autofill function.

SUMMARY

The embodiments described herein provide a system for authenticating a user entering login credentials with biometric data in conjunction with autofill assistance. While autofill may be indicative of a nefarious actor attempting to access a user's account, autofill may also be used by the user or by a webpage to enter certain information. Indeed, a system that flags every form of autofill is not usable with a webpage that uses autofill to assist a user in entering information. For example, a webpage that assists a user by automatically inserting dashes or other characters into a data field is not usable with a system that flags all forms of autofill because every user input will be flagged.

In view of the foregoing, embodiments described herein provide a mechanism for authenticating users in instances where biometric data is collected at the same time that autofill assistance is provided by a webpage. By providing devices, methods, and non-transitory computer-readable media for authenticating users using biometric data in conjunction with autofill assistance, embodiments described herein enable users to be authenticated in a faster and more efficient manner relative to biometric data without any autofill assistance. Moreover, the devices, methods, and non-transitory computer-readable media described herein are usable with autofill assistance on webpages when other systems will simply flag all forms of autofill, which significantly reduces their effectiveness.

One embodiment provides an example electronic computing device. The electronic computing device includes a memory including a user account and an electronic processor communicatively coupled to the memory. The electronic processor is configured to receive a request to access the user account and biometric data associated with the request, determine whether an autofill assistance occurred while the biometric data was captured, responsive to determining that the autofill assistance occurred while the biometric data was captured, identify data associated with the autofill assistance in the biometric data, generate second biometric data by excluding the data associated with the autofill assistance from the biometric data, and perform user authentication based on the second biometric data.

Another embodiment provides an example method. The method includes receiving, with an electronic processor, a request to access a user account and biometric data associated with the request. The method includes determining, with the electronic processor, whether an autofill assistance occurred while the biometric data was captured. The method includes responsive to determining that the autofill assistance occurred while the biometric data was captured, identifying, with the electronic processor, data associated with the autofill assistance in the biometric data. The method includes generating, with the electronic processor, second biometric data by excluding the data associated with the autofill assistance from the biometric data. The method also includes performing, with the electronic processor, user authentication based on the second biometric data.

Yet another embodiment provides an example non-transitory computer-readable medium comprising instructions that, when executed by an electronic processor, causes the electronic processor to perform a set of operations. The set of operations includes receiving a request to access a user account and biometric data associated with the request. The set of operations includes determining whether an autofill assistance occurred while the biometric data was captured. The set of operations includes responsive to determining that the autofill assistance occurred while the biometric data was captured, identifying data associated with the autofill assistance in the biometric data. The set of operations includes generating second biometric data by excluding the data associated with the autofill assistance from the biometric data. The set of operations also includes performing user authentication based on the second biometric data.

DETAILED DESCRIPTION OF THE EMBODIMENTS

One or more embodiments are described and illustrated in the following description and accompanying drawings. These embodiments are not limited to the specific details provided herein and may be modified in various ways.

Figure 1:
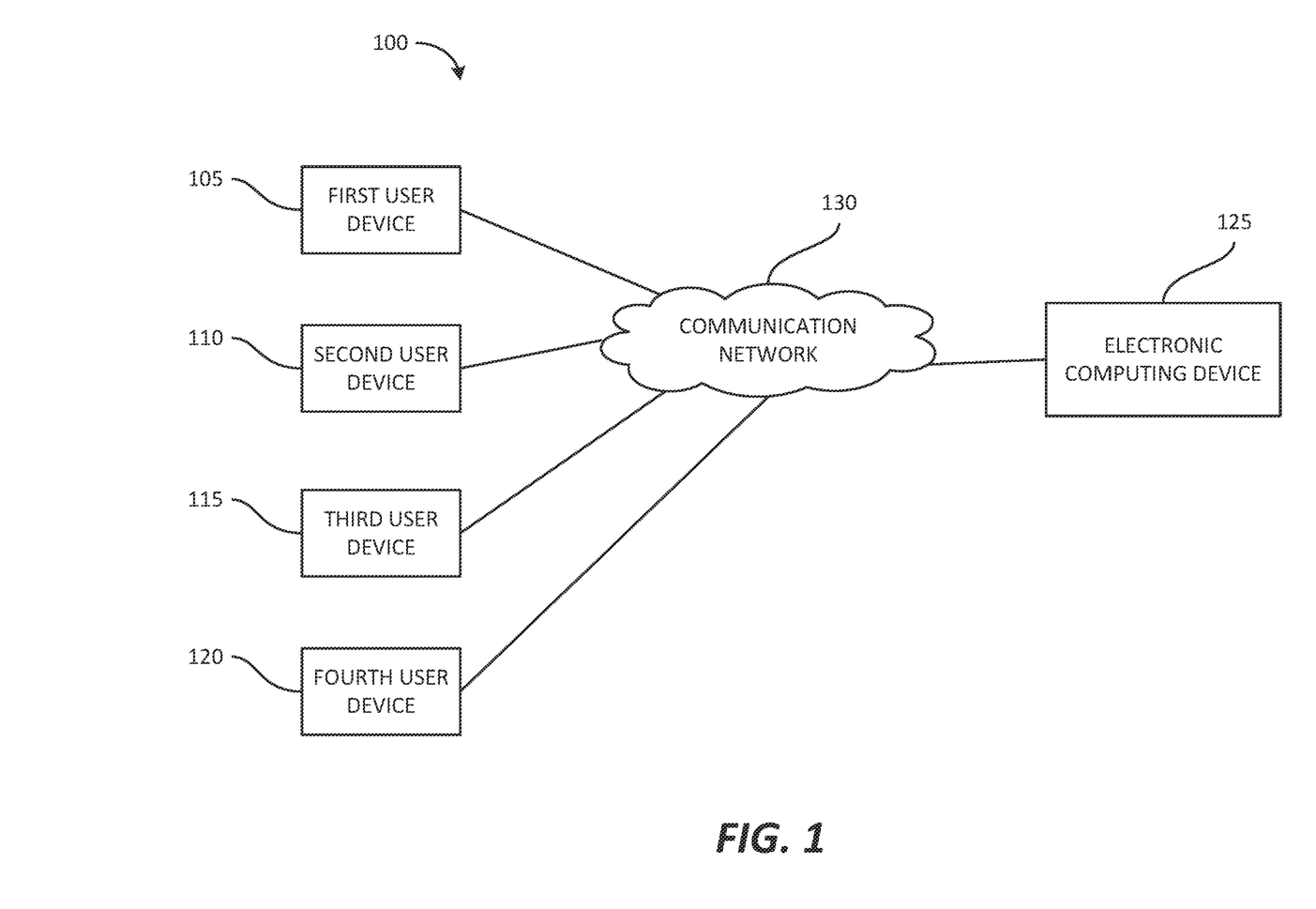
FIG. 1 is a block diagram of an example system for authenticating user entering login credentials with biometric data in conjunction with autofill assistance, in accordance with various aspects of the present disclosure.

FIG. 1 is a block diagram of an example system 100 for authenticating user entering login credentials with biometric data in conjunction with autofill assistance, in accordance with various aspects of the present disclosure. In the example shown, the system 100 includes a first user device 105, a second user device 110, a third user device 115, and a fourth user device 120 (referred to herein collectively as the user devices 105, 110, 115, 120) and an electronic computing device 125. The electronic computing device 125 and user devices 105, 110, 115, 120 are communicatively coupled via a communication network 130. The communication network 130 is an electronic communications network including wireless and wired connections. The communication network 130 may be implemented using a variety of one or more networks including, but not limited to, a wide area network, for example, the Internet; a local area network, for example, a Wi-Fi network; or a near-field network, for example, a Bluetooth™ network.

It should be understood that the system 100 may include a different number of user devices and that the four user devices 105, 110, 115, 120 included in FIG. 1 are purely for illustrative purposes. It should also be understood that the system 100 may include a different number of electronic computing devices than the number of electronic computing devices illustrated in FIG. 1 and the functionality described herein as being performed by the electronic computing device 125 may be performed by a plurality of electronic computing devices. It should be understood that some of the functionality described herein as being performed by the electronic computing device 125 may be performed by a user device. It should also be understood that some of the functionality described herein as being performed by a user device may be performed by the electronic computing device 125.

In the embodiment illustrated in FIG. 1, the electronic computing device 125 may be, for example, a server that is configured to provide a webpage with autofill assistance and authenticate a user. In the embodiment illustrated in FIG. 1, the user devices 105, 110, 115, 120 are electronic computing devices (for example, a smart telephone, a laptop computer, a desktop computer, a smart wearable, a smart appliance, a smart home assistant, or other type of electronic computing device configured to operate as described herein).

Figure 2:
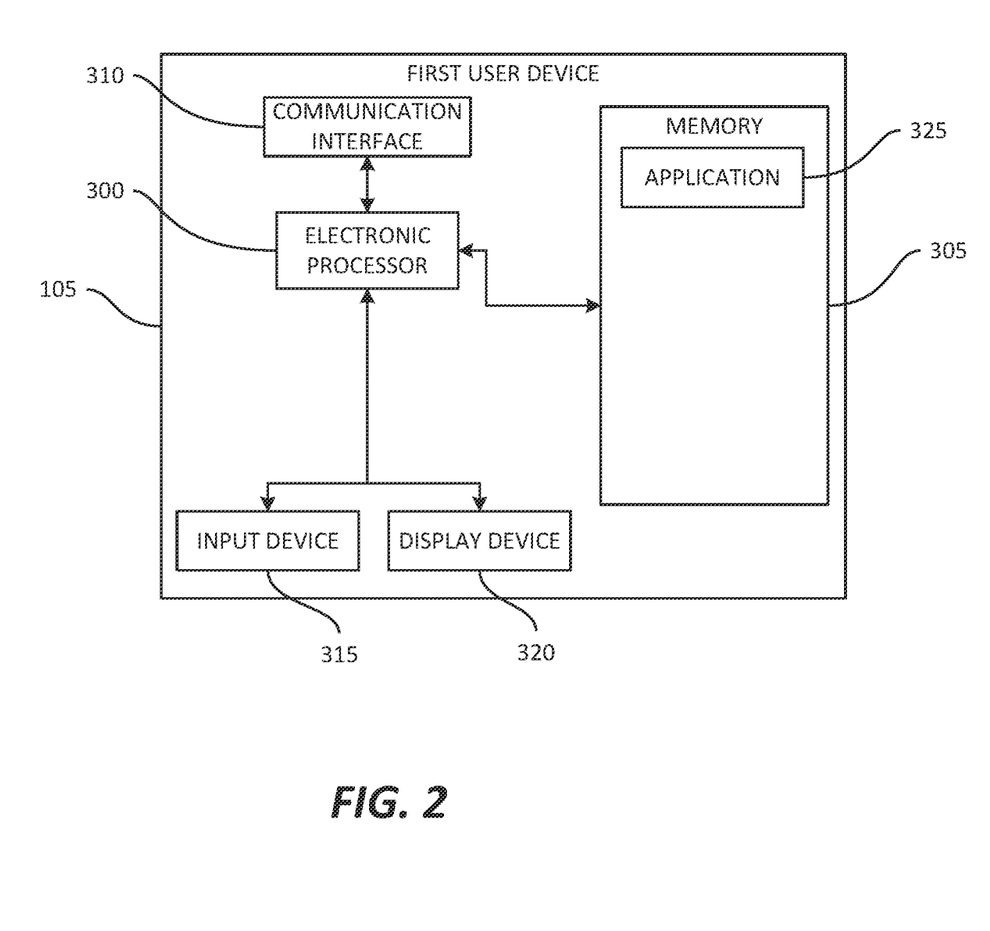
FIG. 2 is a block diagram of an example of a first user device, in accordance with various aspects of the present disclosure.

FIG. 2 is a block diagram of an example of a first user device 105, in accordance with various aspects of the present disclosure. As illustrated in FIG. 2, the first user device 105 is an electronic computing device that includes an electronic processor 200 (for example, a microprocessor, application-specific integrated circuit (ASIC), or another suitable electronic device), a memory 205 (a non-transitory, computer-readable storage medium), and a communication interface 210, such as a transceiver, for communicating over the communication network(s) 130 and, optionally, over one or more additional communication networks or connections. The communication interface 210 allows the first user device 105 to communicate with the electronic computing device 125 over the communication network(s) 130.

The first user device 105 also includes an input device 215 and a display device 220. The display device 220 may include, for example, a touchscreen, a liquid crystal display ("LCD"), a light-emitting diode ("LED"), a LED display, an organic LED ("OLED") display, an electroluminescent display ("ELD"), and the like. The input device 215 may include, for example, a keypad, a mouse, a touchscreen (for example, as part of the display device 220, or the like (not shown). The electronic processor 200, the memory 205, the communication interface 210, the input device 215, and the display device 220 communicate wirelessly, over one or more communication lines or buses, or a combination thereof.

It should be understood that the first user device 105 may include additional components than those illustrated in FIG. 2 in various configurations and may perform additional functionality than the functionality described herein. For example, in some embodiments, the first user device 105 includes multiple electronic processors, multiple memories, multiple communication interfaces, multiple input devices, multiple output devices, or a combination thereof. Also, it should be understood that, although not described or illustrated herein, the second user device 110, third user device 115, and fourth user device 120 may include similar components and perform similar functionality as the first user device 105.

As illustrated in FIG. 2, the memory 205 included in the first user device 105 includes an application 225. The application 225 is a software application that allows a user to access sensitive information (web content). For example, the application 225 may allow access to a user's bank account, credit card, healthcare information, or the like when a user enters login credentials into a login form and the user is authenticated. As described above, a user is authenticated by verifying that a user associated with the entered login credentials (or, for example, the user account 315 described below) is the user that entered the login credentials into the login form.

Figure 3:
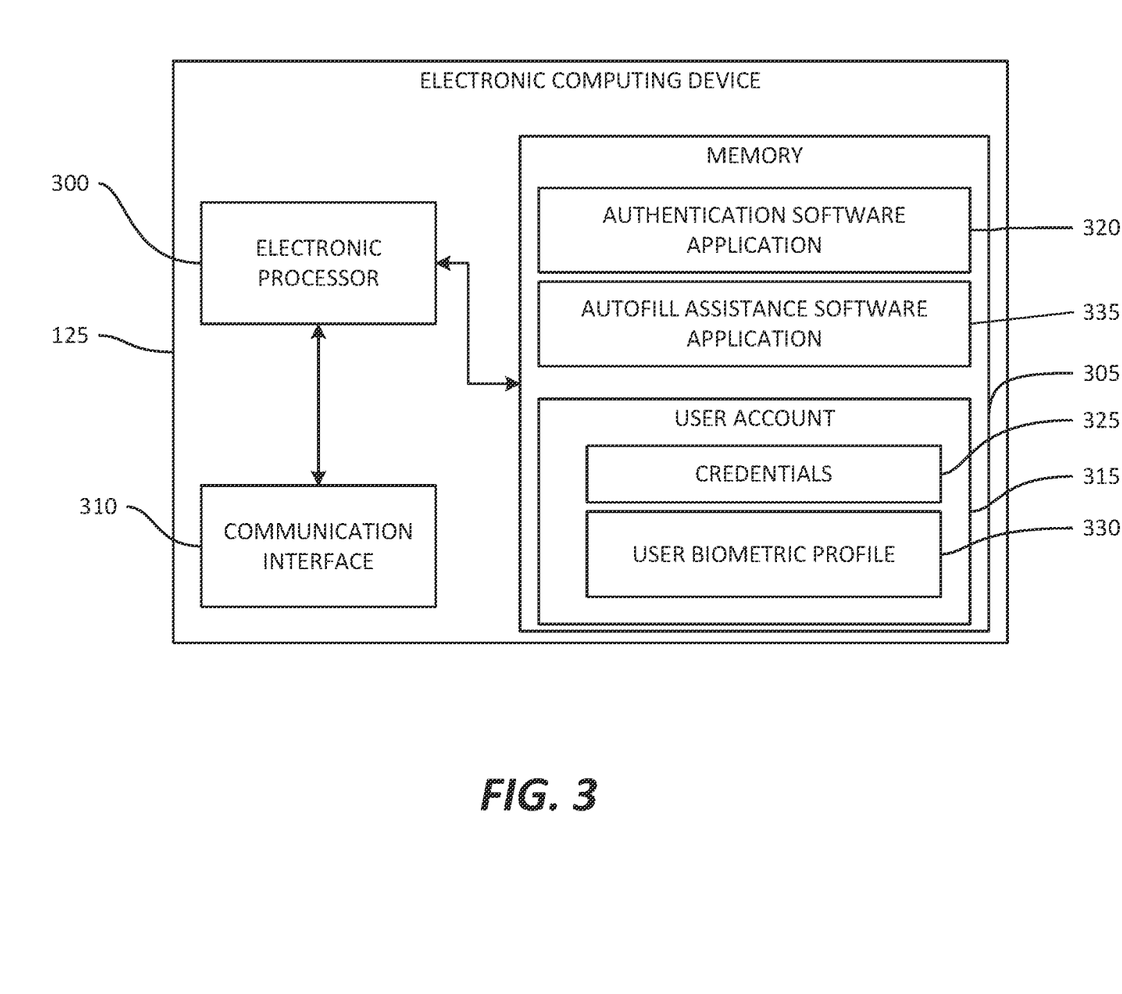
FIG. 3 is a block diagram of an example of an electronic computing device, in accordance with various aspects of the present disclosure.

FIG. 3 is a block diagram of an example of the electronic computing device 125, in accordance with various aspects of the present disclosure. As illustrated in FIG. 3, the electronic computing device 125 includes an electronic processor 300 (for example, a microprocessor, application-specific integrated circuit (ASIC), or another suitable electronic device), a memory 305 (a non-transitory, computer-readable storage medium), and a communication interface 310, such as a transceiver, for communicating over the communication network(s) 130 and, optionally, one or more additional communication networks or connections. The communication interface 310 allows the electronic computing device 125 to communicate with the user devices 105, 110, 115, 120 over the communication network(s) 130.

As illustrated in FIG. 3, the memory 305 included in the electronic computing device 125 includes a user account 315, an authentication software application 320, and an autofill assistance software application 335. The user account 315 is associated with one user and associated with credentials 325. The credentials 325 may be a username, a password, a pin number, an identification number, a payment account number, a combination of the foregoing, or the like. The user account 315 is also associated with a user biometric profile 330. The user biometric profile 330 includes data (historical biometric data) relating to how the user accesses the user account 315. For example, the user biometric profile 330 may include information, such as keystroke rate, number of mouse clicks per minute of the user, or other information that biometrically defines how a user is entering information into a data field. It should be noted that the memory 305 may include a different number of user accounts and that the single user account 315 included in FIG. 3 are purely for illustrative purposes.

The electronic processor 300, when executing the authentication software application 320 and the autofill assistance software application 335, collects biometric data of the user while the user attempts to access the user account with the assistance of autofill. For example, the electronic processor 300, when executing the authentication software application 320 and the autofill assistance software application 335, collects biometric data of the user while the user enters login credentials or payment information on a webpage hosted by the electronic computing device 125, where the webpage inserts one or more characters (e.g., a dash, an asperand, or other characters) automatically into the login credentials or the payment information.

The authentication software application 320 may detect the insertion of characters by the autofill assistance software application 335 in different ways. For example, the authentication software application 320 may generate an autofill detection number by subtracting a predetermined number of characters from characters entered into a data field and compare the autofill detection number with the characters expected in the user account 315. In some examples, the predetermined number of characters may be a constant set by the autofill assistance software application 335.

When the autofill detection number is equal to the expected characters of the username, the authentication software application 320 detects autofill assistance. When the autofill detection number is not equal to the expected characters of the username, the authentication software application 320 detects no autofill assistance.

In one particular example, when a username is entered into a data field, the authentication software application 320 may add a dash to the characters entered into the data field, generate an autofill detection number by subtracting a character from the string of characters entered, and compare the autofill detection number to the expected characters of the username. When the autofill detection number is equal to the expected characters of the username, the authentication software application 320 detects autofill assistance with respect to the user entering the username.

Alternatively, in other examples, the authentication software application 320 may add a predetermined number of characters instead of subtracting the predetermined number of characters. In these examples, the addition of the predetermined number of characters is based off what is actually entered by a user rather than a total number of characters entered into a data field.

In both the above examples, the authentication software application 320 detects autofill assistance when the actual number of characters entered by a user is less than the total number of characters entered into the data field. Put simply, the authentication software application 320 detects autofill assistance when more information was entered into a data field than what was entered by a user.

When the electronic processor 300 detects the autofill assistance, the electronic processor 300, when executing the authentication software application 320 and the autofill assistance software application 335, excludes any of the data collected and associated with a character that was entered by autofill assistance. For example, the electronic processor 300 excludes the data associated with a dash that was entered by the autofill assistance from the biometric data. By excluding the data associated with the dash, the biometric data does not include any data entered by the autofill assistance software application 335. Instead, the biometric data that is collected is limited to data that is entered by a user and collected by the authentication software application 320.

After excluding the data that was entered by the autofill assistance from the biometric data, the electronic processor 300, when executing the authentication software application 320, performs authentication of the user based on the biometric data. For example, the electronic processor 300, when executing the authentication software application 320, authenticates the biometric data against the user biometric profile 330.

However, in some examples, the authentication software application 320 is not limited to user authentication, and the authentication software application 320 may be extended to perform other operations. For example, after detecting autofill assistance, the authentication software 320 may perform a fraud detection operation or a good user verification/detection operation in addition to, or instead of, the user authentication.

Figure 4:
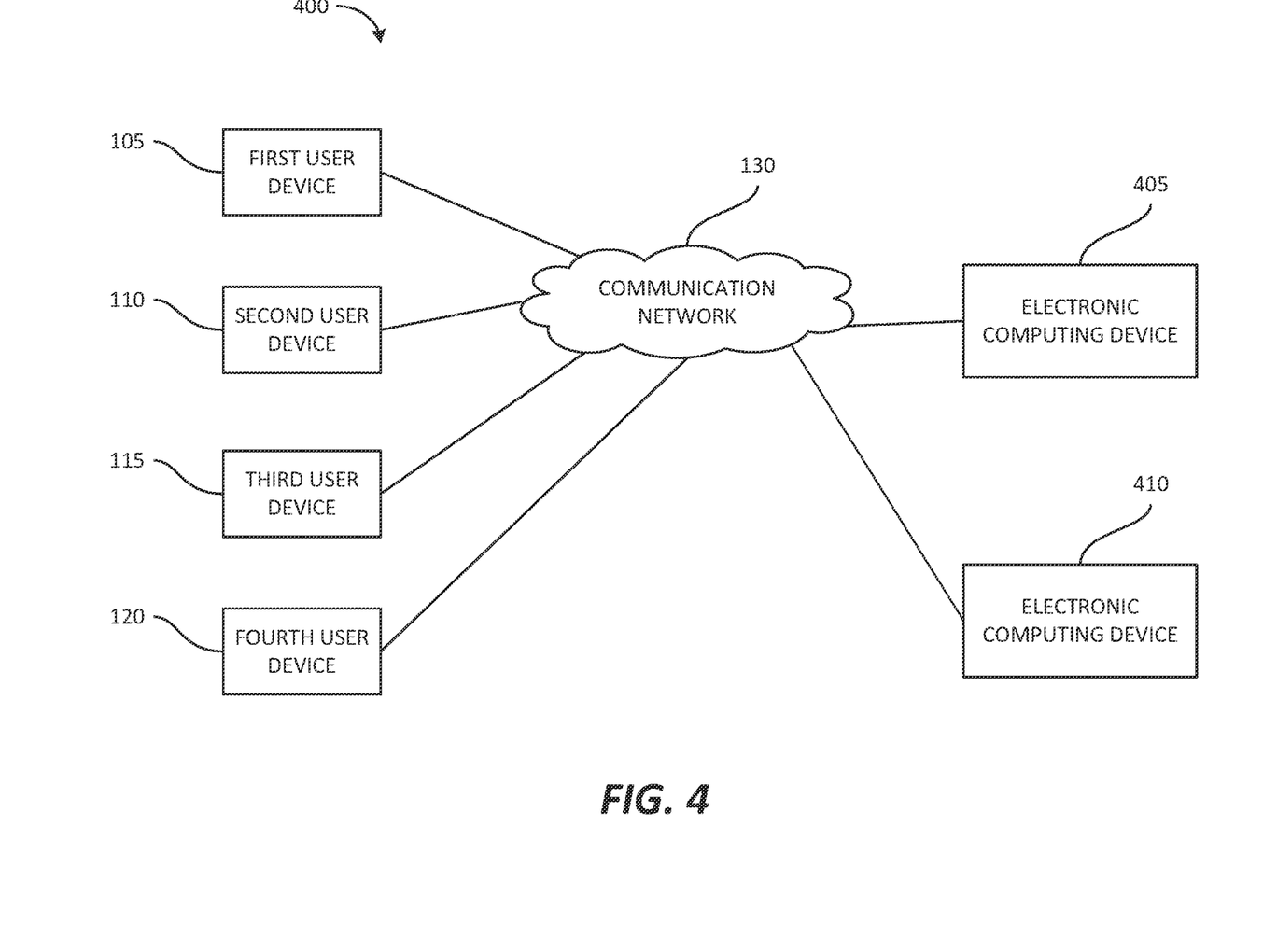
FIG. 4 is a block diagram of a second example system for authenticating user entering login credentials with biometric data in conjunction with autofill assistance, in accordance with various aspects of the present disclosure.

FIG. 4 is a block diagram of a second example system 400 for authenticating user entering login credentials with biometric data in conjunction with autofill assistance, in accordance with various aspects of the present disclosure. In the example shown, the system 400 is similar to the system 100 with the use of an electronic computing device 405 and an electronic computing device 410 in place of the electronic computing device 125. In the embodiment illustrated in FIG. 4, the electronic computing device 405 may be, for example, a server that is configured to authenticate a user. Further, the electronic computing device 410 may be, for example, a server that provides a webpage with autofill assistance.

Figure 5:
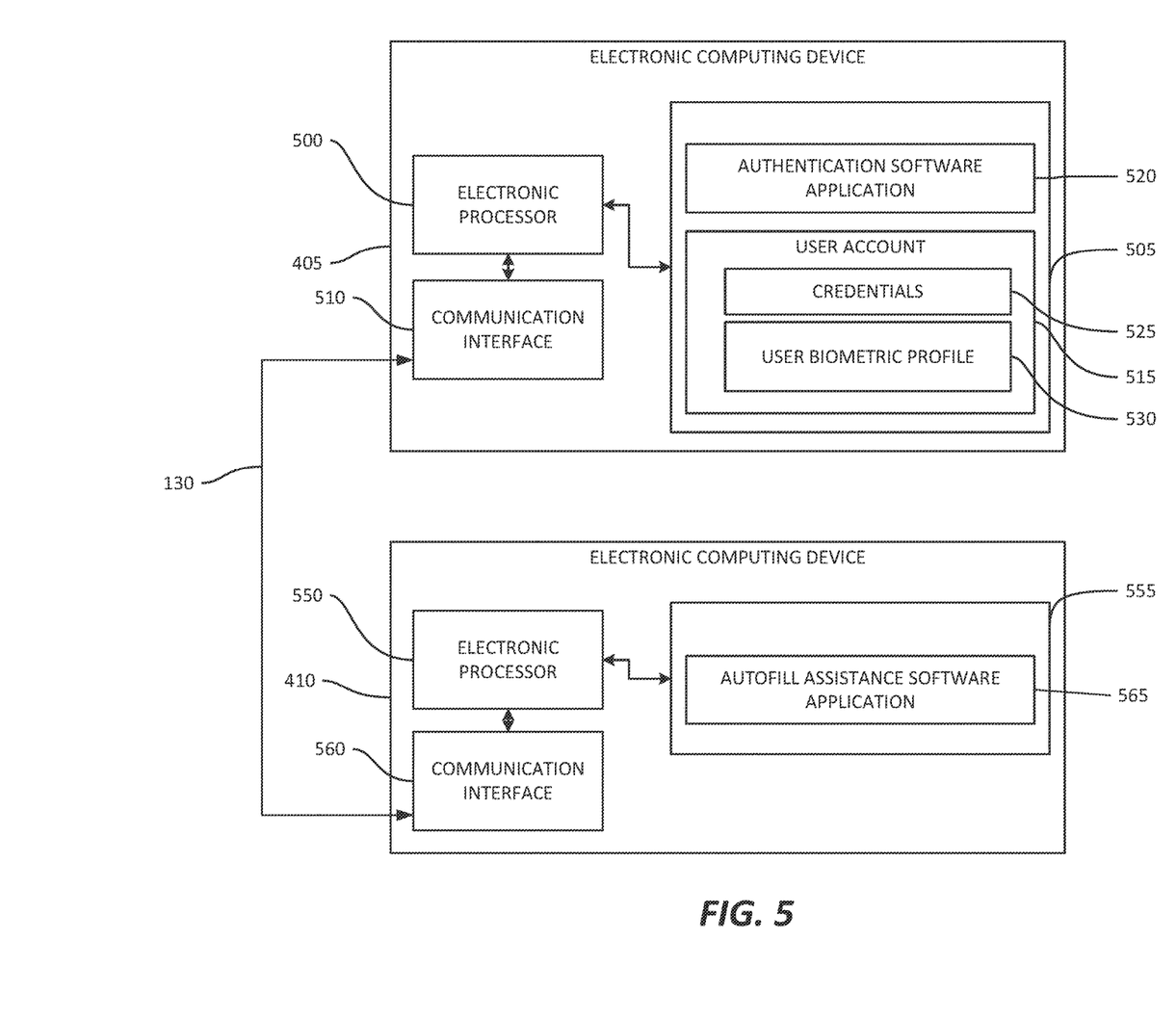
FIG. 5 is a block diagram of an example of electronic computing devices of FIG. 4, in accordance with various aspects of the present disclosure.

FIG. 5 is a block diagram of an example of the electronic computing devices 405 and 410 of FIG. 4, in accordance with various aspects of the present disclosure. As illustrated in FIG. 5, the electronic computing device 405 includes an electronic processor 500 (for example, a microprocessor, application-specific integrated circuit (ASIC), or another suitable electronic device), a memory 505 (a non-transitory, computer-readable storage medium), and a communication interface 510, such as a transceiver, for communicating over the communication network(s) 130 and, optionally, one or more additional communication networks or connections. The communication interface 510 allows the electronic computing device 405 to communicate with the user devices 105, 110, 115, 120 over the communication network(s) 130 as well as the electronic computing device 410 as illustrated in FIG. 4.

The memory 505 included in the electronic computing device 405 includes a user account 515, and an authentication software application 520. The user account 515 is associated with one user and associated with credentials 525. The credentials 525 may be a username, a password, a pin number, an identification number, a payment account number (e.g., a remuneration vehicle number), a combination of the foregoing, or the like. The user account 515 is also associated with a user biometric profile 530. The user biometric profile 530 includes data (historical biometric data) relating to how the user accesses the user account 515. For example, the user biometric profile 530 may include information, such as keystroke rate, number of mouse clicks per minute of the user, or other information that biometrically defines how a user is entering information into a data field. It should be noted that the memory 505 may include a different number of user accounts and that the single user account 515 included in FIG. 5 are purely for illustrative purposes.

The electronic computing device 405, when executing the authentication software application 520, performs the functionality of "user authentication" as described above with respect to the authentication software application 320 as described above in FIG. 3. In particular, the electronic computing device 405, when executing the authentication software application 520, performs the detection of autofill assistance as described above in FIG. 3 with respect to the electronic computing device 410.

As illustrated in FIG. 5, the electronic computing device 410 includes an electronic processor 550 (for example, a microprocessor, application-specific integrated circuit (ASIC), or another suitable electronic device), a memory 555 (a non-transitory, computer-readable storage medium), and a communication interface 560, such as a transceiver, for communicating over the communication network(s) 130 and, optionally, one or more additional communication networks or connections. The communication interface 560 allows the electronic computing device 410 to communicate with the user devices 105, 110, 115, 120 over the communication network(s) 130 as well as the electronic computing device 405 as illustrated in FIG. 4.

As illustrated in FIG. 5, the memory 555 includes an autofill assistance software application 565. The electronic computing device 410, when executing the autofill assistance software application 565, performs the functionality of "autofill assistance" as described above with respect to the autofill assistance software application 335 as described above in FIG. 3.

Figure 6:
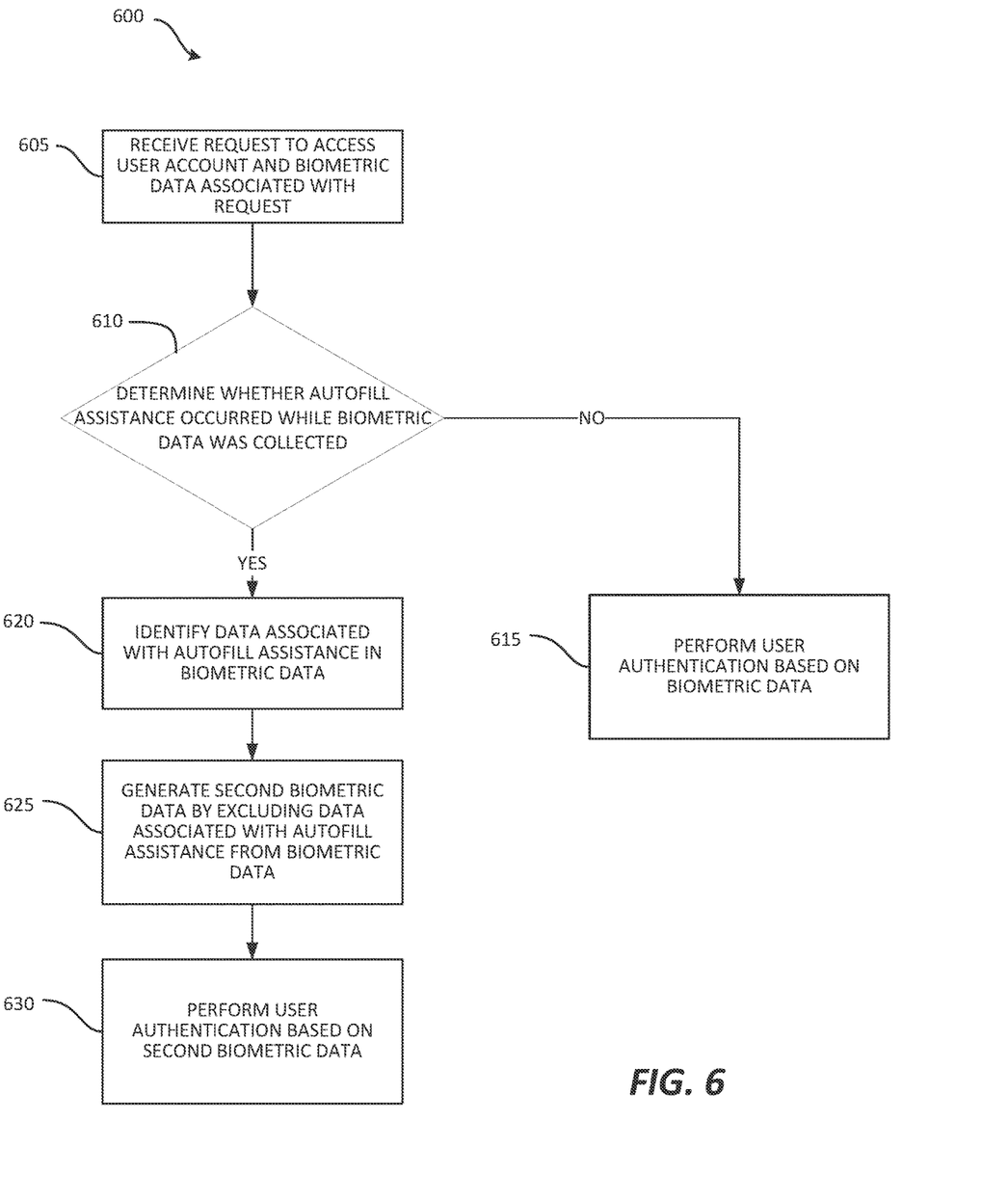
FIG. 6 is a flow chart illustrating an example method of detecting autofill assistance and performing user authentication with biometric data in conjunction with the autofill assistance, in accordance with various aspects of the present disclosure.

FIG. 6 is a flow chart illustrating an example method 600 of detecting autofill assistance and performing user authentication with biometric data in conjunction with the autofill assistance, in accordance with various aspects of the present disclosure. For ease of understanding, the method 600 is described with respect to the electronic computing device 125 of FIG. 3. However, the method 600 is also applicable to the electronic computing devices 405 and 410 of FIG. 5.

The method 600 is performed by the electronic processor 300, when the electronic processor 300 executes the authentication software application 320. At block 605, the electronic processor 300 receives a request to access a user account (for example, receives a request to access the user account 315) and biometric data associated with the request, the biometric data capable of authenticating the user. The request may also include a time stamp.

At decision block 610, the electronic processor 300 determines whether an autofill assistance occurred while the biometric data was collected. For example, the electronic processor 300 determines whether any characters were inserted into a data field while a user was providing an input into the data field.

In some embodiments, the electronic processor 300 determining whether any characters were inserted into the data field while the user was providing an input into the data field may include generating an autofill detection number by subtracting a predetermined number of characters from a total number of characters entered into a data field, confirming the autofill assistance occurred when the autofill detection number is equal to an expected number of characters, and confirming the autofill assistance did not occur when the autofill detection number is different from the expected number of characters. In these embodiments, the electronic processor 300 may also identify the total number of characters from the request and the expected number of characters from information regarding the user account stored in a memory.

In other embodiments, the electronic processor 300 determining whether any characters were inserted into the data field while the user was providing an input into the data field may include generating an autofill detection number by adding a predetermined number of characters to an expected number of characters entered into a data field, confirming the autofill assistance occurred when the autofill detection number is equal to a total number of characters entered into the data field, and confirming the autofill assistance did not occur when the autofill detection number is different from the total number of characters entered into the data field. In these embodiments, the electronic processor 300 may also identify the expected number of characters from information regarding the user account stored in the memory and the total number of characters from the request.

At block 615, when the electronic processor 300 determines that autofill assistance did not occur while the biometric data was collected ("NO" at decision block 610), the electronic processor 300 performs user authentication based on the biometric data that was included in the request or collected after requesting biometric data (at block 615). For example, the electronic processor 300 compares the biometric data that was collected to the user biometric profile 330 and authenticates the user based on the comparison.

However, when the electronic processor 300 determines that autofill assistance did occur while the biometric data was collected ("YES" at decision block 610), the electronic processor 300 identifies data associated with autofill assistance in the biometric data that was included in the request or received after requesting the collection of biometric data (at block 620). For example, the electronic processor 300 may identify the data associated with the autofill assistance from information in the request, pre-set exclusion settings, an active determination between autofill biometric data and non-autofill biometric data, or other suitable identification process.

At block 625, the electronic processor 300 generates second biometric data by excluding data associated with autofill assistance from the biometric data. For example, the electronic processor 300 excludes any data from the biometric data that is identified from the information in the request, the pre-set exclusion settings, the active determination between autofill biometric data and non-autofill biometric data, or the other suitable identification process.

At block 630, the electronic processor 300 performs user authentication based on the second biometric data. For example, the electronic processor 300 compares the second biometric data to the user biometric profile 330 and authenticates the user based on the comparison.

It should be understood that other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used herein, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. An electronic computing device comprising:
a memory including a user account; and
an electronic processor communicatively coupled to the memory, the electronic processor is configured to
receive a request to access the user account and biometric data associated with the request,
determine whether an autofill assistance occurred while the biometric data was captured,
responsive to determining that the autofill assistance occurred while the biometric data was captured, identify data associated with the autofill assistance in the biometric data,
generate second biometric data by excluding the data associated with the autofill assistance from the biometric data, and
perform user authentication based on the second biometric data,
wherein, to determine whether the autofill assistance occurred while the biometric data was captured, the electronic processor is further configured to
generate an autofill detection number by subtracting a predetermined number of characters from a total number of characters entered into a data field,
confirm the autofill assistance occurred when the autofill detection number is equal to an expected number of characters, and
confirm the autofill assistance did not occur when the autofill detection number is different from the expected number of characters.

2. The electronic computing device of claim 1, wherein the electronic processor is further configured to:
responsive to determining that the autofill assistance did not occur while the biometric data was captured, perform user authentication based on the biometric data.

3. The electronic computing device of claim 1, wherein the electronic processor is further configured to identify the total number of characters from the request and the expected number of characters from information regarding the user account stored in the memory.

4. The electronic computing device of claim 1, wherein the electronic processor is configured to:
receive a second request to access the user account and third biometric data associated with the second request,
determine whether the autofill assistance occurred while the third biometric data was captured,
responsive to determining that the autofill assistance occurred while the third biometric data was captured, identify second data associated with the autofill assistance in the third biometric data,
generate fourth biometric data by excluding the second data associated with the autofill assistance from the third biometric data, and
perform second user authentication based on the fourth biometric data,
wherein, to determine whether the autofill assistance occurred while the third biometric data was captured, the electronic processor is further configured to
generate a second autofill detection number by adding a second predetermined number of characters to a second expected number of characters entered into second data field,
confirm the autofill assistance occurred when the second autofill detection number is equal to a second total number of characters entered into the second data field, and
confirm the autofill assistance did not occur when the second autofill detection number is different from the second total number of characters entered into the second data field.

5. The electronic computing device of claim 4, wherein the electronic processor is further configured to identify the second expected number of characters from information regarding the user account stored in the memory and the second total number of characters from the second request.

6. The electronic computing device of claim 1, wherein, to identify the data associated with the autofill assistance in the biometric data, the electronic processor is further configured to identify the data associated with the autofill assistance in the biometric data from information in the request, pre-set exclusion settings, or an active determination between autofill biometric data and non-autofill biometric data.

7. A method comprising:
receiving, with an electronic processor, a request to access a user account and biometric data associated with the request;
determining, with the electronic processor, whether an autofill assistance occurred while the biometric data was captured;

responsive to determining that the autofill assistance occurred while the biometric data was captured, identifying, with the electronic processor, data associated with the autofill assistance in the biometric data;

generating, with the electronic processor, second biometric data by excluding the data associated with the autofill assistance from the biometric data; and performing, with the electronic processor, user authentication based on the second biometric data, wherein determining whether the autofill assistance occurred while the biometric data was captured further includes generating an autofill detection number by subtracting a predetermined number of characters from a total number of characters entered into a data field, confirming the autofill assistance occurred when the autofill detection number is equal to an expected number of characters, and confirming the autofill assistance did not occur when the autofill detection number is different from the expected number of characters.

8. The method of claim 7, further comprising:
responsive to determining that the autofill assistance did not occur while the biometric data was captured, performing user authentication based on the biometric data.

9. The method of claim 7, further comprising:
identifying the total number of characters from the request and the expected number of characters from information regarding the user account stored in a memory.

10. The method of claim 7, further comprising:
receiving, with the electronic processor, a second request to access the user account and third biometric data associated with the second request;

determining, with the electronic processor, whether the autofill assistance occurred while the third biometric data was captured;

responsive to determining that the autofill assistance occurred while the third biometric data was captured, identifying, with the electronic processor, second data associated with the autofill assistance in the third biometric data;

generating, with the electronic processor, fourth biometric data by excluding the second data associated with the autofill assistance from the third biometric data; and performing, with the electronic processor, second user authentication based on the fourth biometric data, wherein determining whether the autofill assistance occurred while the third biometric data was captured further includes generating a second autofill detection number by adding a second predetermined number of characters to a second expected number of characters entered into a second data field, confirming the autofill assistance occurred when the second autofill detection number is equal to a second total number of characters entered into the second data field, and confirming the autofill assistance did not occur when the second autofill detection number is different from the second total number of characters entered into the second data field.

11. The method of claim 10, further comprising:
identifying the second expected number of characters from information regarding the user account stored in a memory and the second total number of characters from the second request.

12. The method of claim 7, wherein identifying the data associated with the autofill assistance in the biometric data further includes identifying the data associated with the autofill assistance in the biometric data from information in the request, pre-set exclusion settings, or an active determination between autofill biometric data and non-autofill biometric data.

13. A non-transitory computer-readable medium comprising instructions that, when executed by an electronic processor, causes the electronic processor to perform a set of operations comprising:

receiving a request to access a user account and biometric data associated with the request;

determining whether an autofill assistance occurred while the biometric data was captured;

responsive to determining that the autofill assistance occurred while the biometric data was captured, identifying data associated with the autofill assistance in the biometric data;

generating second biometric data by excluding the data associated with the autofill assistance from the biometric data; and performing user authentication based on the second biometric data, wherein determining whether the autofill assistance occurred while the biometric data was captured further includes generating an autofill detection number by subtracting a predetermined number of characters from a total number of characters entered into a data field, confirming the autofill assistance occurred when the autofill detection number is equal to an expected number of characters, and confirming the autofill assistance did not occur when the autofill detection number is different from the expected number of characters.

14. The non-transitory computer-readable medium of claim 13, further comprising:
responsive to determining that the autofill assistance did not occur while the biometric data was captured, performing user authentication based on the biometric data.

15. The non-transitory computer-readable medium of claim 13, further comprising:
identifying the total number of characters from the request and the expected number of characters from information regarding the user account stored in a memory.

16. The non-transitory computer-readable medium of claim 13, wherein the set of operations further includes
receiving a second request to access the user account and third biometric data associated with the second request;

determining whether the autofill assistance occurred while the third biometric data was captured;

responsive to determining that the autofill assistance occurred while the third biometric data was captured, identifying second data associated with the autofill assistance in the third biometric data;

generating fourth biometric data by excluding the second data associated with the autofill assistance from the third biometric data; and performing second user authentication based on the fourth biometric data, wherein determining whether the autofill assistance occurred while the third biometric data was captured further includes generating a second autofill detection number by adding a second predetermined number of characters to a second expected number of characters entered into a second data field, confirming the autofill assistance occurred when the second autofill detection number is equal to a second total number of characters entered into the second data field, and confirming the autofill assistance did not occur when the second autofill detection number is different from the second total number of characters entered into the second data field.

17. The non-transitory computer-readable medium of claim 13, wherein identifying the data associated with the autofill assistance in the biometric data further includes identifying the data associated with the autofill assistance in the biometric data from information in the request, pre-set exclusion settings, or an active determination between autofill biometric data and non-autofill biometric data.

* * * * *